Feb. 12, 1924.
M. S. CORSAT
DEVICE FOR SOLDERING ALUMINIUM
Original Filed Aug. 2, 1921
1,483,337
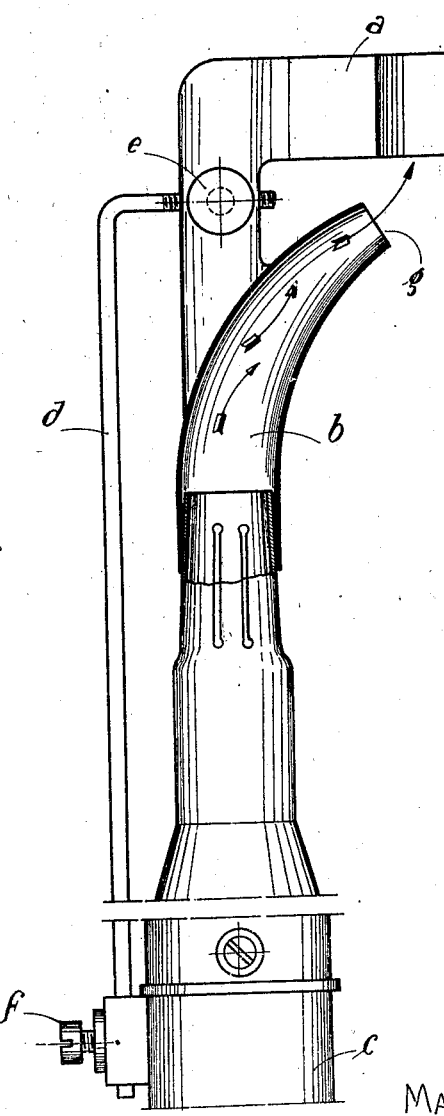
INVENTOR
MARCEL S. CORSAT,
by Arthur Middleton
atty.

Patented Feb. 12, 1924.

1,483,337

UNITED STATES PATENT OFFICE.

MARCEL SAÏD CORSAT, OF BACHET DE PESAY, CAROUGE, SWITZERLAND.

DEVICE FOR SOLDERING ALUMINUM.

Application filed August 2, 1921, Serial No. 489,307. Renewed July 16, 1923.

(GRANTED UNDER THE PROVISIONS OF THE ACT OF MARCH 3, 1921, 41 STAT. L., 1313.)

*To all whom it may concern:*

Be it known that I, MARCEL SAÏD CORSAT, a citizen of the Swiss Republic, residing at Bachet de Pesay, Carouge, Switzerland, have invented certain new and useful Improvements in Devices for Soldering Aluminum (for which I have filed application in Switzerland July 29, 1920, Patent No. 87,593), of which the following is a specification.

The present invention relates to a device for soldering aluminum, comprising a part intended to spread the solder and a nozzle, both being attached to a spirit blow pipe.

The part intended to spread the solder is of iron, and the nozzle for directing the flame of the spirit blow pipe against the aluminum to be soldered is in proximity with the part for spreading the solder, which part also is heated by the flame.

The accompanying drawing shows by way of example one embodiment of the present invention.

The figure represents diagrammatically an embodiment of spreader and nozzle attached to a blowpipe.

The device for soldering aluminum comprises the part *a* adapted to spread the solder and the nozzle *b* both attached to and adjustable in relation to a spirit blow pipe *c*, partly shown in the drawing, and secured thereto by means of a support *d* screwed at one end into the part *a*, this support being fixed by a locking screw with lugs *e*. The support *d* is attached to the blow pipe *c* at its other extremity by means of a screw *f*.

The device is employed for soldering, for example in the following manner:—

Assuming that the tool is attached to the blow pipe *c* and the latter is set in operation, the pieces of aluminum to be soldered together are carefully cleaned by filing or for example, by means of emery paper.

The flame of the spirit blow pipe *c* which escapes from the nozzle *g* is then directed on to one of these pieces. When the metal is considered sufficiently heated it is rubbed with a stick of plumber's solder. The solder is then spread by means of the part *a* which is moved along over the piece of aluminum which is to be soldered to the second piece, this operation being continued until a perfect tinning is produced.

The second piece is then treated in the same manner; when both pieces are perfectly tinned they can be joined by being placed in mutual contact.

What I claim and desire to secure by Letters Patent is:—

1. In combination a blowpipe, a nozzle therefor telescopically engaging said blowpipe, an extension on said nozzle extending substantially in line with said blowpipe, and a right angular portion to said extension in line with the axis of said nozzle.

2. The device of claim 1, said nozzle being curved whereby the flame of the blowpipe is deflected to one side and against the right angular portion.

In testimony whereof I affix my signature.

MARCEL SAÏD CORSAT.

Witnesses:
H. NAPWING,
F. HAUTIN.